United States Patent [19]

Oshida

[11] Patent Number: 5,671,299

[45] Date of Patent: Sep. 23, 1997

[54] BUS SYSTEM FOR ACCESSING A MEMORY IN AN IMAGE PROCESSING SYSTEM

[75] Inventor: Eizi Oshida, Kanagawa-ken, Japan

[73] Assignee: Fuji Photo Film Co., Ltd., Kanagawa, Japan

[21] Appl. No.: 447,680

[22] Filed: May 23, 1995

[30] Foreign Application Priority Data

May 24, 1994 [JP] Japan ..................................... 6-109312

[51] Int. Cl.$^6$ ..................................... G06K 9/00
[52] U.S. Cl. ..................................... 382/307
[58] Field of Search ..................................... 382/232, 305, 382/307; 395/287, 477, 307, 308

[56] References Cited

U.S. PATENT DOCUMENTS

| | | | |
|---|---|---|---|
| 4,817,050 | 3/1989 | Komatsu et al. | 364/900 |
| 5,033,106 | 7/1991 | Kita | 382/56 |
| 5,165,103 | 11/1992 | Takeda et al. | 382/56 |
| 5,384,643 | 1/1995 | Inga et al. | 358/403 |
| 5,452,102 | 9/1995 | Yokoyama et al. | 358/426 |

*Primary Examiner*—Andrew Johns
*Attorney, Agent, or Firm*—Sughrue, Mion, Zinn, Macpeak & Seas

[57] ABSTRACT

An image processing system includes control section which various control signals are input into and output from, at least one image data input/output section which image data are input into and output from in response to a control signal from the control section, an image memory which temporarily stores the image data input from the image data input/output section and at least one image processing section which reads out the image data from the image memory in response to a control signal from the control section and processes the image data. A data bus controller is connected to the image memory by way of a single data bus and to the image data input/output sections and the image processing sections by way of respective data buses. The controller packs a plurality of pieces of image data input thereinto from the image data input/output sections and/or the image processing sections and outputs the packed image data to the image memory in response to a control signal from the control section while unpacks packed image data input thereinto from the image memory into a plurality of pieces of image data and outputs the pieces of image data to the image data input/output sections and/or the image processing sections in response to a control signal from the control section.

7 Claims, 4 Drawing Sheets

F I G. 1
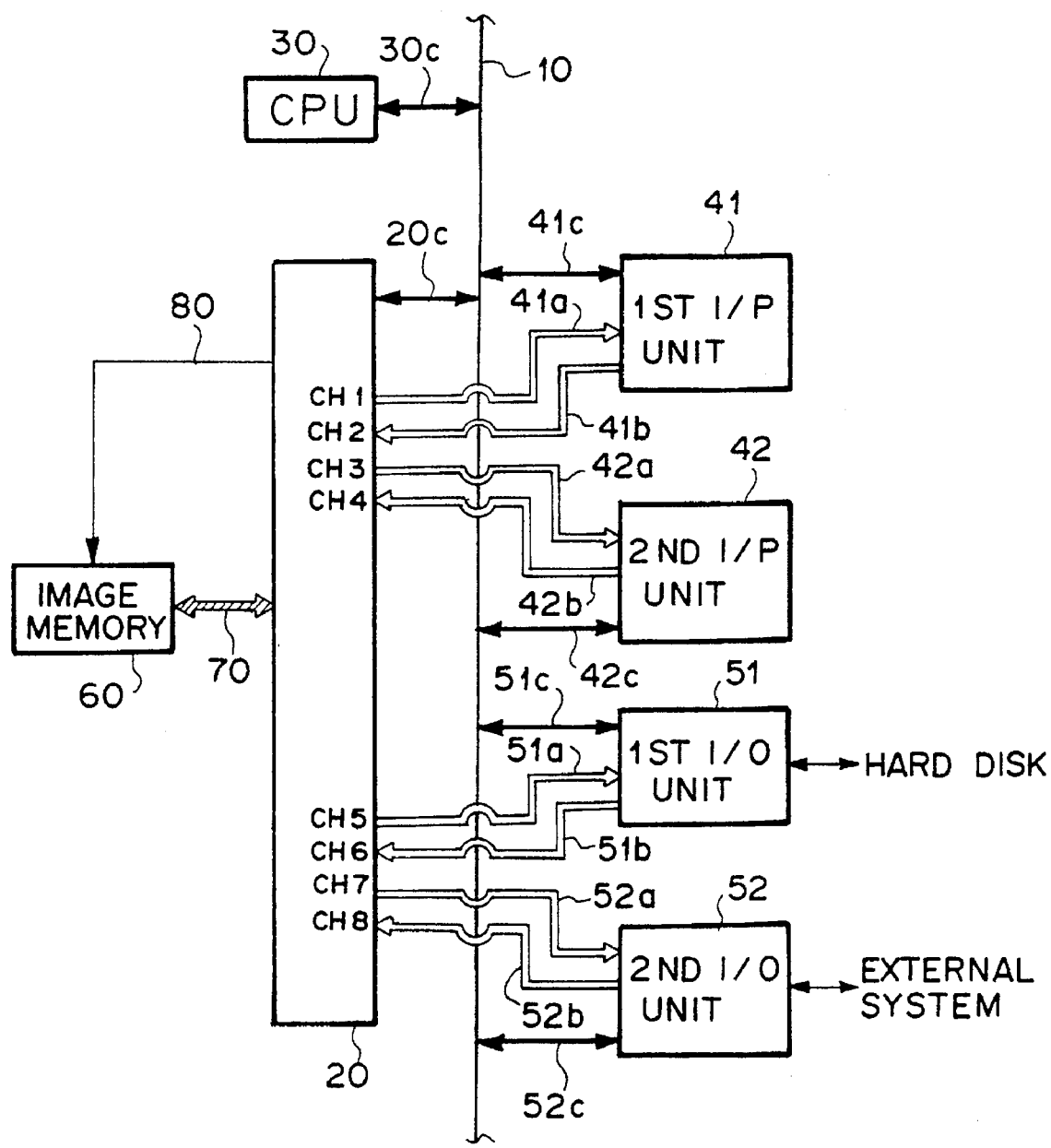

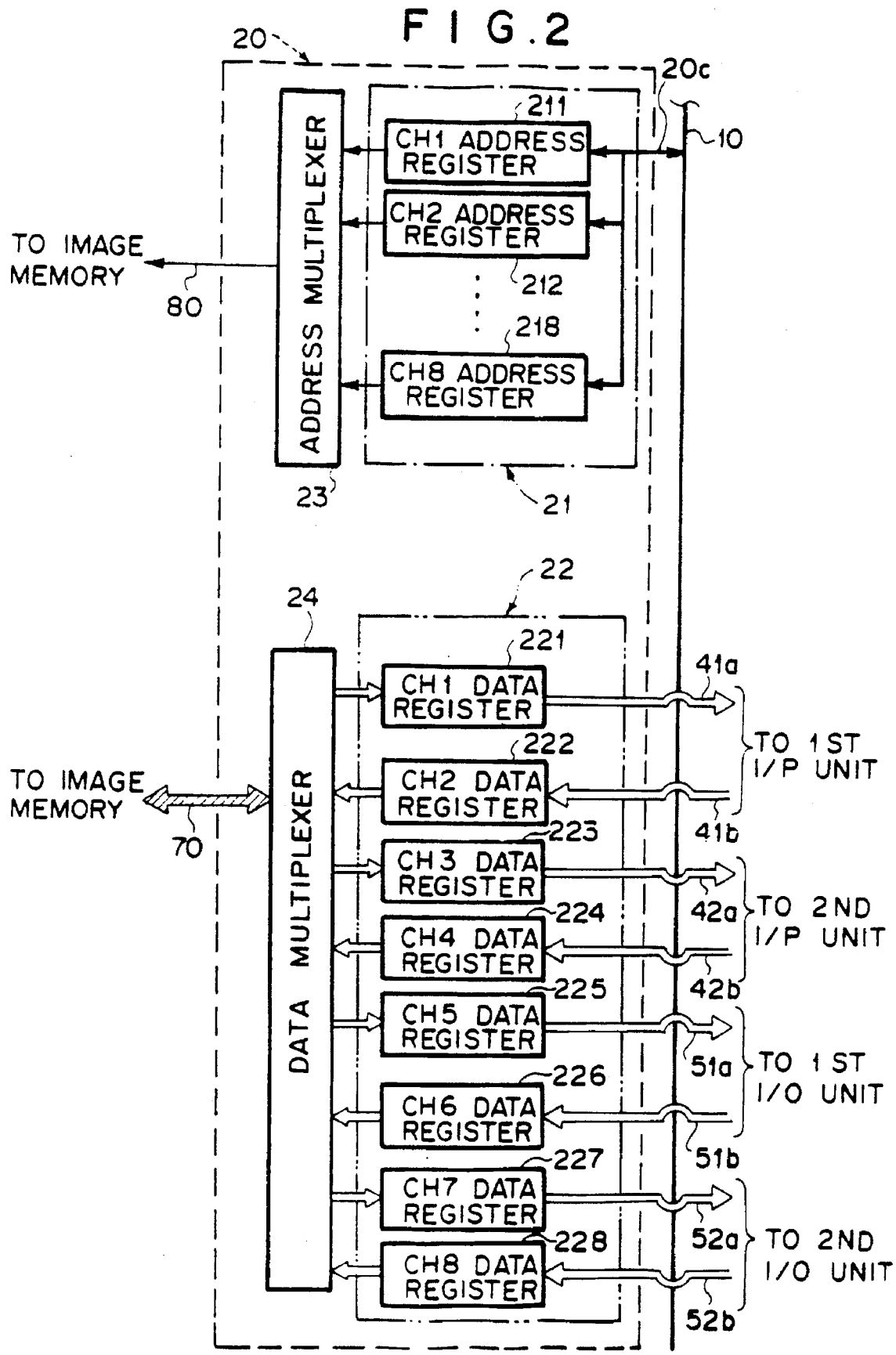

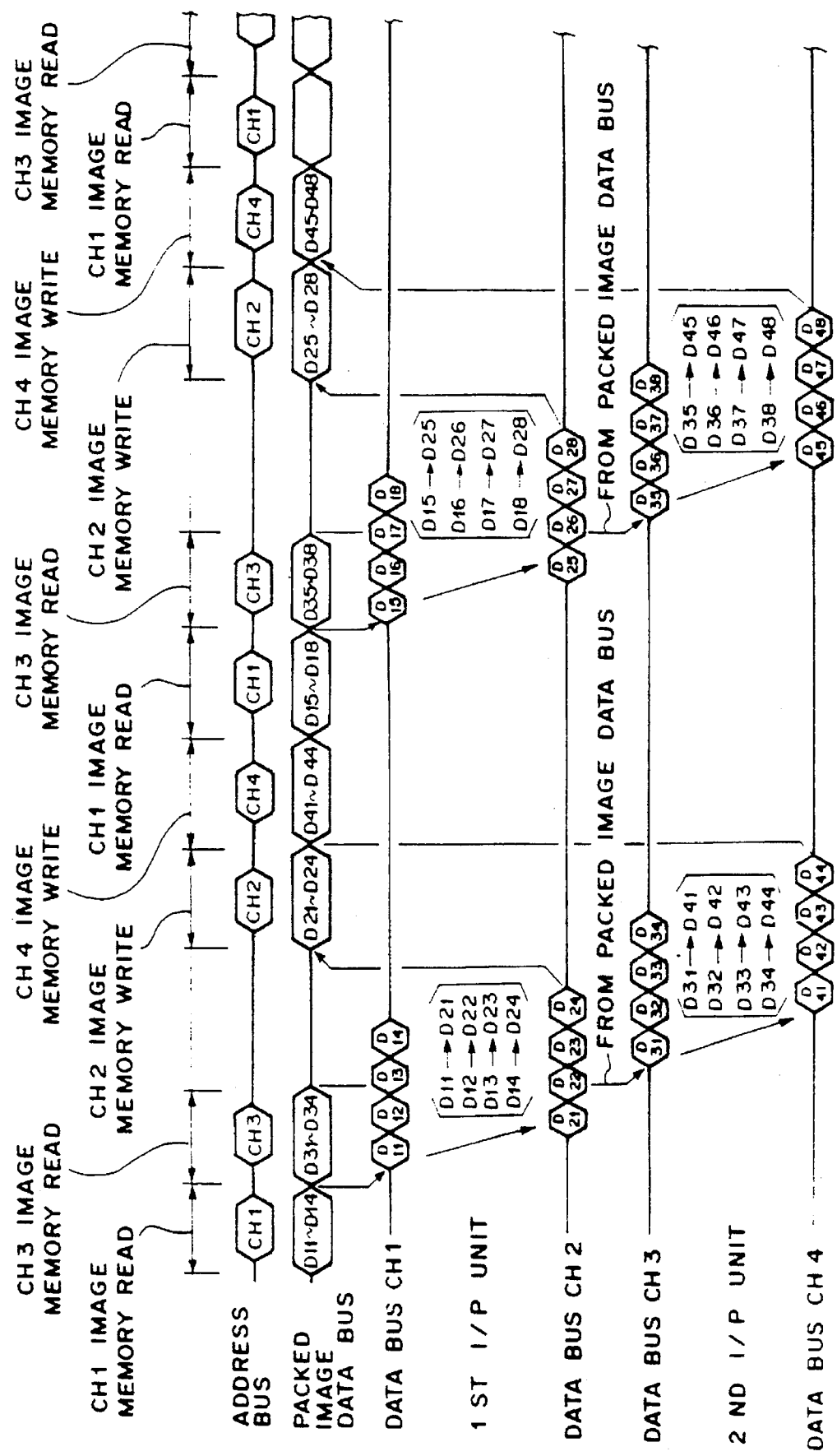

BUS SYSTEM FOR ACCESSING A MEMORY IN AN IMAGE PROCESSING SYSTEM

BACKGROUND OF THE INVENTION

1. Field of the Invention

This invention relates to an image processing system, and more particularly to an improvement in a signal bus for an image memory provided in an image processing system.

2. Description of the Prior Art

There has been known an image processing system in which an image obtained by radiography or the like is photoelectrically read to obtain digital image data and the digital image data is suitably processed to reproduce the image in density and gradation optimal to observation. Various image processing systems have been put into practice as a system for carrying out such an image processing. In the image processing systems, image data input from an image data input/output section in response to a control signal from a control section are once stored in an image memory, and the image data stored in the image memory are input into an image processing section and subjected to a predetermined image processing. The processed image data are then stored in the image memory and output to the exterior through the image data input/output section.

Generally the image processing systems can be divided into two types. One type system comprises one control bus for transmitting the control signal from the control section and one data bus for inputting and outputting image data into and from the image memory, and the image processing section and the image data input/output section are separately connected to the control bus by way a plurality of control signal lines and to the data bus by way of a plurality of data lines, whereby the data bus is used by the image processing section and the image data input/output section in a time division system. In this type of system, when a plurality of image processing sections are to be connected in order to effect different image processings and a plurality of image data input/output sections are to be connected in order to make image data transmission with other image processing systems, the image processing sections and the image data input/output sections are connected to the data bus by way of separate data lines. This system is advantageous in that the image processing sections and the image data input/output sections can be easily increased.

The other type system is substantially the same as the former type system in the structure of the control signal bus but has no main data bus. The image processing section and the image data input/output section are connected to the image memory by way of separate data buses and are connected with each other by way of a data bus. In this system, when a plurality of image processing sections and/or image data input/output sections are to be connected, the image processing sections and the image data input/output sections are connected to the image memory by way of separate data buses and are connected with each other by way of separate data buses. This system is advantageous in that input/output of image data can be controlled without lowering throughput even if image data are simultaneously input and output into and from a plurality of image processing sections and/or image data input/output sections.

The former type system is disadvantageous in that when a plurality of image processing sections and a plurality of image data input/output sections are connected and a plurality of image processing sections and image data input/output sections substantially simultaneously access the data bus, the overall throughput of the image processing system lowers since the data bus is used in a time division system.

On the other hand, the latter type system is disadvantageous in that when a plurality of image processing sections and image data input/output sections are to be connected, they must be connected by data buses not only to the image memory but also to each other, which limits the freedom in expansion of the system.

SUMMARY OF THE INVENTION

In view of the foregoing observations and description, the primary object of the present invention is to provide an image processing system in which the overall throughput of the system is high and at the same time the freedom in expansion of the system is high.

In the image processing system of the present invention, each image processing section and each image data input/output section are connected to a data bus control section, and the data bus control section packs a plurality of pieces of image data transmitted from the image processing section and/or the image data input/output section to compress the data length and stores the packed image data in the image memory, while the data bus control section unpacks packed image data transmitted from the image memory into a plurality of pieces of image data and outputs the pieces of image data to the image processing section and/or the image data input/output section.

That is, in accordance with the present invention there is provided an image processing system comprising control section which various control signals are input into and output from, at least one image data input/output section which image data are input into and output from in response to a control signal from the control section, an image memory which temporarily stores the image data input from the image data input/output section and at least one image processing section which reads out the image data from the image memory in response to a control signal from the control section and processes the image data, wherein the improvement comprises a data bus control section which is connected to the image memory by way of a single data bus and to the image data input/output sections and the image processing sections by way of respective data buses; packs a plurality of pieces of image data input thereinto from the image data input/output sections and/or the image processing sections and outputs the packed image data to the image memory in response to a control signal from the control section; and unpacks packed image data input thereinto from the image memory into a plurality of pieces of image data and outputs the pieces of image data to the image data input/output sections and/or the image processing sections in response to a control signal from the control section.

The data bus control section may comprise
- a memory address generation section which generates address signals for storing the image data in the image memory in response to a control signal from the control section,
- an address multiplexer which selectively outputs the address signals generated by the memory address generation section,
- a data packing section which packs a plurality of pieces of image data input from the image processing sections and/or the image data input/output sections and outputs the packed image data to the image memory, and unpacks packed image data input from the image memory into a plurality of pieces of image data and outputs the unpacked image data to the image processing sections and/or the image data input/output sections, and a data multiplexer section which is provided between the data packing section and the image memory and selectively outputs to the image memory the image data input from the data packing section and outputs to the data packing section the image data input from the image memory.

In the image processing system of the present invention, the control section input a control signal into the image processing sections and/or the image data input/output sections by way of the control bus, and the image processing sections and/or the image data input/output sections input a plurality of pieces of image data into the data bus control section by way of the data buses. The data bus control section packs the pieces of image data input thereinto into a packed image data and outputs the packed image data to the image memory through the data bus.

When a control signal is transmitted to the data bus control section from the control section by way of the control bus, the packed image data are read out from the image memory. The packed image data are input into the data bus control section by way of the data bus and unpacked into a plurality of pieces of image data.

The pieces of image data are input into the image data input/output sections and/or the image processing sections by way of the data buses.

In the image processing system of the present invention, the data bus control section packs a plurality of image data and stores the packed image data in the image memory, and accordingly the time required to input and output image data into and from the image memory is shortened and the overall throughput of the system is not lowered even if image data is transmitted to or from a plurality of image processing units and/or a plurality of input/output units at one time. Further since the data buses for the image processing sections and the image data input/output sections are connected only between the data bus control section and the respective image processing sections and the image data input/output sections, the system can be easily expanded.

BRIEF DESCRIPTION OF THE DRAWINGS

FIG. 1 is a block diagram showing the structure of an image processing system in accordance with one embodiment of the present invention, FIG. 2 is a block diagram showing in detail the data bus controller, FIG. 3 is a time chart for illustrating the operation of the image processing system.

DESCRIPTION OF THE PREFERRED EMBODIMENT

Figures 4A, 4B:
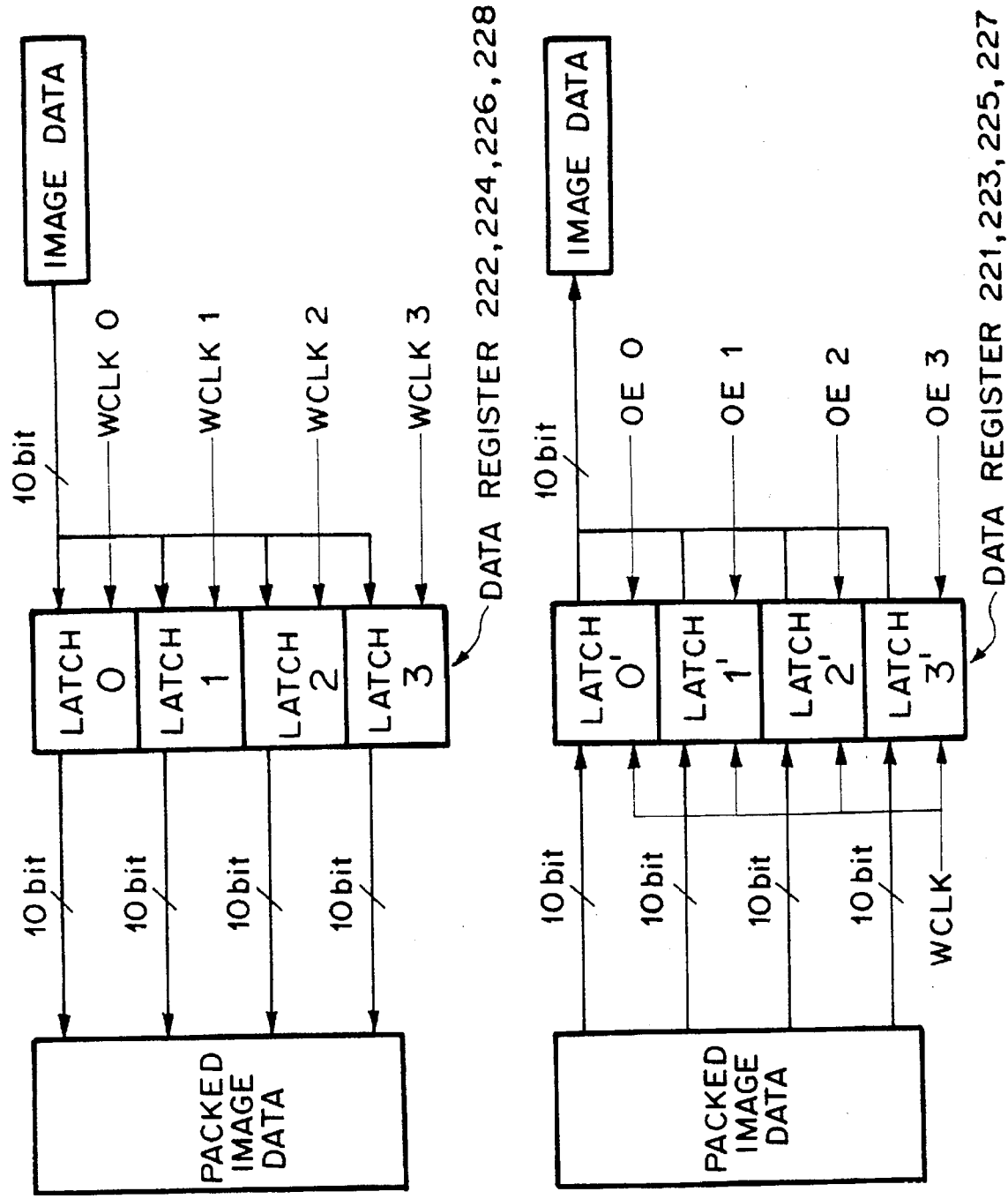
FIG. 4A is a block diagram showing the structure and operation of the data registers for packing data.
FIG. 4B is a block diagram showing the structure and operation of the data registers for unpacking data.

In FIG. 1, an image processing system in accordance with an embodiment of the present invention comprises a CPU 30 to and from which control signals are input and output, a first input/output unit 51 which transmits image data to or from a hard disk in response to the control signals, a second input/output unit 52 which transmits image data to or from an external system, an image memory 60 which temporarily stores image data input from the first and second input/output units 51 and 52, and first and second image processing units 41 and 42 which read out the image stored in the image memory 60 in response to the control signals and process the image data. The system further comprises one control bus 10 which transmits the control signals, and control lines 51c, 52c, 41c, 42c, 30c and 20c which respectively connect the first and second input/output units 51 and 52, the first and second image processing units 41 and 42, the CPU 30 and a data bus controller 20 (to be described later) to the control bus 10.

The data bus controller 20 is provided between the image memory 60 and the input/output units and the image processing units 51, 52, 41 and 42, and as shown in FIG. 2, comprises a memory address generation section 21, an address multiplexer 23, a data packing section 22 and a data multiplexer section 24. The memory address generation section 21 generates address signals for storing the image data in the image memory 60 in response to the control signals from the CPU 30. The address multiplexer 23 selectively outputs the address signals generated by the memory address generation section 21. The data packing section 22 packs a plurality of pieces of image data input from the image processing units 41 and 42 and/or the input/output units 51 and 52 and outputs the packed image data to the image memory 60, and unpacks packed image data input from the image memory 60 into a plurality of pieces of image data and outputs the unpacked image data to the image processing units 41 and 42 and/or the input/output units 51 and 52. The data multiplexer section 24 is provided between the data packing section 22 and the image memory 60, and selectively outputs to the image memory 60 the image data input from the data packing section 22 and outputs to the data packing section 22 the image data input from the image memory 60. The system further comprises data buses 51a, 51b, 52a, 52b, 41a, 41b, 42a and 42b which respectively connect the input/output units 51 and 52 and the image processing units 41 and 42 with the data bus controller 20. The data buses 51a, 52a, 41a and 42a transmits image data from the data bus controller 20 to the input/output units 51 and 52 and the image processing units 41 and 42 and the data buses 51b, 52b, 41b and 42b transmits image data from the input/output units 51 and 52 and the image processing units 41 and 42 to the data bus controller 20. An address bus 80 connects the data bus controller 20 and the image memory 60 and transmits address signals to the image memory 60. A data bus 70 connects the data bus controller 20 and the image memory 60 and transmits packed image data in which a plurality of pieces of image data are packed.

The data bus controller 20 is provided with eight channels CH1 to CH8 to which the data buses 41a, 41b, 42a, 42b, 51a, 51b, 52a, and 52b for the image processing units 41 and 41 and the input/output units 51 and 52 are respectively connected. The memory address generation section 21 is provided with address registers 211 to 218 for the respective channels Ch1 to CH8, and the data packing section 22 is provided with data registers 221 to 228 for the respective channels Ch1 to CH8. The data registers 221, 223, 225 and 227 unpack image data and the data registers 222, 224, 227 and 228 unpack image data.

The data bus 70 is 40 bits and the data buses 41a, 41b, 42a, 42b, 51a, 51b, 52a, and 52bare 10 bits in width.

The operation of the image processing system of this embodiment will be described, hereinbelow.

FIG. 3 is a timing chart for illustrating the operation of the image processing system of this embodiment when image data are input into and output from the first and second image processing units 41 and 42 substantially simultaneously. The channel CH1 is a transfer channel from the image memory 60 to the first image processing unit 41. First the CPU 30 outputs an image data readout control signal.

The control signal is input into the memory address generation section 21 in the data bus controller 20 through the control line 30c, the control bus 10 and the control line 20c, and an address signal for packed image data to be read out from the image memory 60 to the channel CH1 is generated by the CH1 address register 211. The address signal is input into the image memory 60 through the address multiplexer 23 and the address bus 80.

The image data output from the first input/output unit 51 or the second input/output unit 52 are packed four pixels by four pixels (e.g., 10 bits/pixel image data D11, D12, D13 and D14) by the CH6 data register 226 or the CH8 data register 228 and are stored in the image memory 60 on the basis of the address signals generated by the CH6 address register 216 or the CH8 address register 218.

The packed image data D11~D14 (40 bits) stored at the address specified by the CH1 address register 211 are read out from the image memory 60 through the data bus 70 and input into the CH1 data register 221 in the data packing section 22 by way of the data multiplexer section 24. The CH1 data register 221 unpacks the packed image data D11~D14 into image data D11, D12, D13 and D14 (D11~D14→D11, D12, D13, D14).

The packing data registers 222, 224, 226 and 228 and the unpacking data registers 221, 223, 225 and 227 will be described with reference to FIGS. 4A and 4B, hereinbelow.

In FIG. 4A, for instance, four pieces of image data which are transferred pixel (10 bits) by pixel in time series from the first image processing unit 41 through the data bus 41b are respectively input into latches (data registers) 0, 1, 2, 3 allocated by latch timing signals WCLK0, WCLK1, WCLK2, WCLK3 generated by a pixel clock. The latches 0, 1, 2, 3 hold the image data input thereinto and output packed image data, in which image data of four pixels (40 bits) are packed, to the data multiplexer section 24.

In FIG. 4B, the packed image data of four pixels transferred from the data multiplexer section 24 are held in latches (data registers) 0', 1', 2', 3' one pixel in each latch. At this time, output enable signals OE0, OE1, OE2, OE3 are respectively input into the latches 0', 1', 2', 3', and four pieces of image data D11, D12, D13 and D14 each for one pixel are output respectively from the latches 0', 1', 2', 3', for instance, to the first image processing unit 41 through the data bus 41a.

The image data D11~D14 of four pixels input into the CH1 data register 221 are unpacked into four pieces of image data D11, D12, D13 and D14 in the manner described above and the four pieces of image data D11, D12, D13 and D14 are output pixel by pixel in this order from the CH1 data register 221 to the first image processing unit 41 through the data bus 41a. The first image processing unit 41 processes the four pieces of image data D11, D12, D13 and D14 in sequence and converts them to four pieces of processed image data D21, D22, D23 and D24.

The operation for the channel CH3 is similar to that for the channel CH1. That is, packed image data D31~D34 (in which four pieces of image data D31, D32, D33 and D34 are packed) stored in the image memory 60 are read out and are unpacked into four pieces of image data D31, D32, D33 and D34 by the CH3 data register 223 of the data packing section 22 in the data bus controller 20. The four pieces of image data D31, D32, D33 and D34 are output pixel by pixel in this order from the CH3 data register 223 to the second image processing unit 42 through the data bus 42a. The second image processing unit 42 processes the four pieces of image data D31, D32, D33 and D34 in sequence and converts them to four pieces of processed image data D41, D42, D43 and D44.

The channel CH2 is a transfer channel to the image memory 60 from the first image processing unit 41. The CPU 30 outputs an image data write control signal. The control signal is input into the first image processing unit 41 through the control line 30c, the control bus 10 and the control line 41c, and the processed image data D21, D22, D23 and D24 processed by the first image processing unit 41 are input into the CH2 data register 222 of the data packing section 22 in the data bus controller 20 through the data bus 41b. The processed image data D21, D22, D23 and D24 input into the CH2 data register 222 are packed into packed image data D21~D24 by the packing operation described above.

The image data write control signal from the CPU 30 is input into the memory address generation section 21 in the data bus controller 20 through the control line 30c, the control bus 10 and the control line 20c, and an address signal for specifying the addresses at which the packed image data of the channel CH2 are to be stored in the image memory 60 is generated by the CH2 address register 212. The address signal is input into the image memory 60 through the address multiplexer 23 and the address bus 80.

Thus the packed image data D21~D24 packed by the CH2 data register 222 are written in the image memory 60 at predetermined addresses by way of the data multiplexer section 24.

The operation for the channel CH4 is similar to that for the channel CH2. That is, the CPU 30 outputs an image data write control signal and the control signal is input into the second image processing unit 42 through the control line 30c, the control bus 10 and the control line 42c, and the processed image data D41, D42, D43 and D44 processed by the second image processing unit 42 are input into the CH4 data register 224 of the data packing section 22 in the data bus controller 20 through the data bus 42b. The processed image data D41, D42, D43 and D44 input into the CH4 data register 224 are packed into packed image data D41~D44.

The image data write control signal from the CPU 30 is input into the memory address generation section 21 in the data bus controller 20 through the control line 30c, the control bus 10 and the control line 20c, and an address signal for specifying the addresses at which the packed image data of the channel CH4 are to be stored in the image memory 60 is generated by the CH4 address register 214. The address signal is input into the image memory 60 through the address multiplexer 23 and the address bus 80.

Thus the packed image data D41~D44 packed by the CH4 data register 224 are written in the image memory 60 at predetermined addresses by way of the data multiplexer section 24.

The operation for the first and second input/output unit 51 and 52 is similar to that for the first and second image processing units 41 and 42. That is, address signals for specifying the channel CH5 to the channel CH8 are generated respectively by the CH5 to CH8 address registers 215 to 218 and the data of the channel CH5 to the channel CH8 specified by the address signals are transferred (not shown) as packed image data in a free time of the packed image data bus, for instance, from the end of read of the CH3 image memory and the initiation of write of the CH2 image memory.

As can be understood from the description above, in the image processing system of this embodiment, the data bus controller 20 packs image data of four pixels and stores the packed image data in the image memory 60, and accordingly the time required to input and output image data into and from the image memory 60 is shortened and the overall throughput of the system is not lowered even if image data is transmitted to or from a plurality of image processing units and/or a plurality of input/output units at one time. Further since the data buses 41a, 41b, 42a, 42b, 51a, 51b, 52a and 52b for the image processing units 41 and 42 and the input/output units 51 and 52 are connected only between the data bus controller 20 and the respective units 41, 42, 51 and 52, increase of these units can be carried out easily, whereby the system can be easily expanded.

Though, in the embodiment described above, the packing size is set to four pixels, the packing size need not be limited to four pixels. When the packing size is larger, the time the data bus is occupied by the image data transferred between the image memory and a system connected to the image memory can be shorter.

Each of the channels in the data packing section 22 of the data bus controller 20 may be provided with a pair of data registers. In this case, by using the two data registers in each channel in a toggle-like fashion, the transfer speed of image data can be increased. That is, in each channel, while one of the data registers is taking in data, the other data register packs or unpacks data.

What is claimed is:

1. An image processing system comprising a control section which receives and provides various control signals, at least one image data input/output section into which image data is input and from which image data is output in response to a control signal from the control section, an image memory which temporarily stores the image data input from the at least one image data input/output section and at least one image processing section which reads out the image data from the image memory in response to a control signal from the control section and processes the image data, wherein the improvement comprises:

a data bus control section which is connected to the image memory by way of a single data bus and to the at least one image data input/output section and the at least one image processing section by way of respective data buses; packs into a parallel format a plurality of serially received pieces of image data, input to the data bus control section from the at least one image data input/ output section and/or the at least one image processing section, thereby forming packed image data, and outputs the packed image data to the image memory in response to a control signal from the control section; and unpacks packed image data input to the data bus control section from the image memory into a plurality of pieces of image data and outputs the pieces of image data to the at least one image data input/output section and/or the at least one image processing section in response to a control signal from the control section.

2. An image processing system as defined in claim 1 in which said data bus control section comprises:

a memory address generation section which generates address signals for storing the image data in the image memory in response to a control signal from the control section, an address multiplexer which selectively outputs the address signals generated by the memory address generation section, a data packing section which packs a plurality of pieces of image data input from the at least one image processing section and/or the at least one image data input/output section and outputs the packed image data to the image memory, and unpacks packed image data input from the image memory into a plurality of pieces of image data and outputs the unpacked image data to the at least one image processing section and/or the at least one image data input/output section, and a data multiplexer section which is provided between the data packing section and the image memory and selectively outputs to the image memory the image data input from the data packing section and outputs to the data packing section the image data input from the image memory.

3. The image processing system as defined in claim 2, wherein:

said data packing section comprises a plurality of pairs of data registers, each pair of data registers comprising a packing data register and an unpacking data register, each pair of data registers corresponding to one of the at least one image processing section or the at least one image data input/output section;

said data multiplexer multiplexing and outputting to the image memory packed image data received from the packing data registers and demultiplexing and outputting to the unpacking data registers packed data received from the image memory;

said memory address generation section comprises a plurality of address registers, each of said address registers corresponding to one of the packing or unpacking data registers in said data packing section; and said address multiplexer outputs to the image memory the address signals from an address register the data multiplexer is to multiplex packed image data from a packing data register corresponding to the address register or demultiplex packed image data destined for an unpacking data register corresponding to the address register.

4. The image processing system as defined in claim 2, wherein:

said data packing section comprises:

at least one data packing register including a plurality of latches, each of said pieces of image data being serially received by said data packing section and being stored in one of said plurality of latches, said latches outputting the stored pieces of image data in parallel, thereby effecting packing of the pieces of image data; and at least one data unpacking register including a plurality of latches, each of said latches receiving a portion of packed image data received from said image memory, said packed image data being unpacked by sequentially outputting data stored in successive ones of said plurality of latches, thereby serially outputting pieces of image data.

5. The image processing system as defined in claim 1, wherein said single data bus is wider than said respective data buses.

6. The image processing system as defined in claim 1, wherein only packed image data is conveyed on said single data bus.

7. The image processing system as defined in claim 1, wherein image data is input to the image memory only from said data bus control section.

* * * * *